J. Peck,
Mortar Mixing,
Nº 9,077. Patented June 29, 1852.
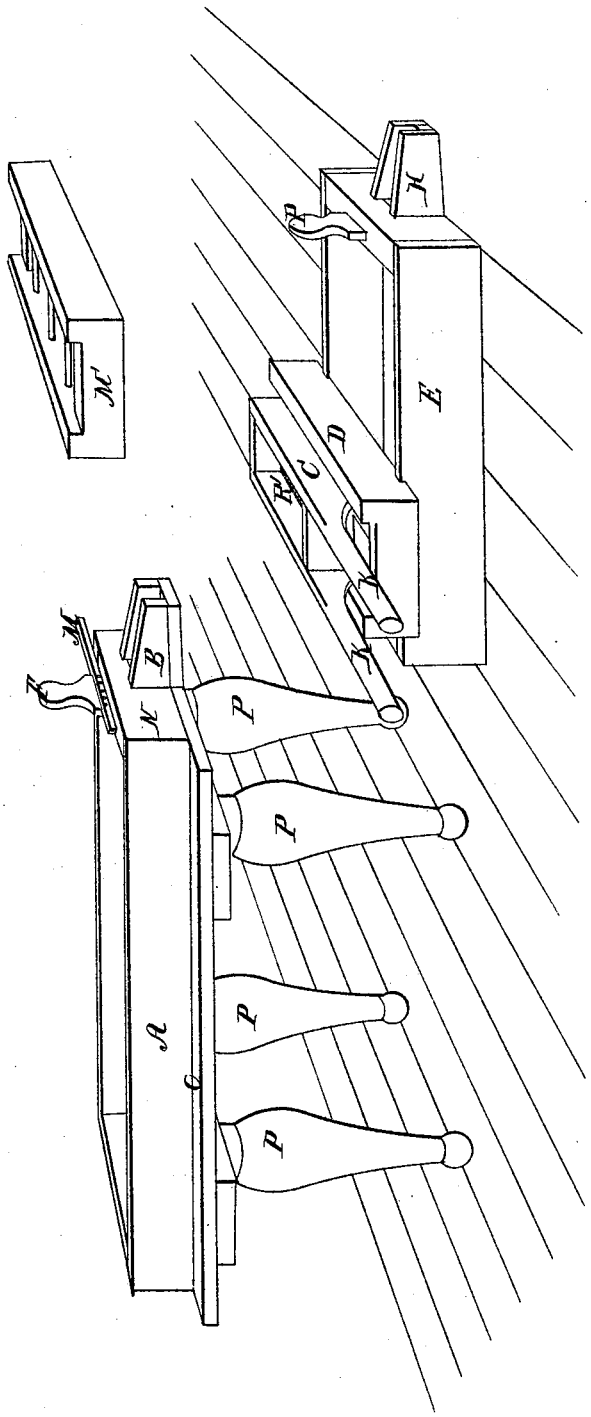

UNITED STATES PATENT OFFICE.

JESSE PECK, OF BUFFALO, NEW YORK.

MIXING MORTAR.

Specification of Letters Patent No. 9,077, dated June 29, 1852.

*To all whom it may concern:*

Be it known that I, JESSE PECK, of the city of Buffalo, county of Erie, and State of New York, have invented or discovered a new and Improved Mode of Mixing Mortar for Laying Brick and for Plastering; and I do hereby declare that the following is a full and exact description thereof, reference being had to the accompanying drawings and to the letters of reference marked thereon.

I construct my reservoir or boxes A and E and their attachments of any suitable material. The boxes may be made in the form of a parallelogram, square, or circular. (For the application of horse, water, or steam power, I make my boxes circular with an upright shaft, arms attached, which can be made to revolve within the rim of the circle.) At the end (N) box A I attach the spout (B) to bear off the mixture which it receives by raising the gate F by means of the lever M.

O, represents the platform on which the laborer or laborers may conveniently stand to do the mixing. The legs P, P, P, P, I make substantial and sufficiently separated to support the weight of the mixture and laborers firmly.

The "reservoirs" or "boxes" may be varied in size according to the demands of business.

C, is intended to represent a sieve frame and R the sieve. This I construct of wire, the interstices of sufficient width to permit the mortar to pass through them, but not so large as to permit coarse gravel, sticks, &c., to pass. Of course the size of the interstices should be determined by the character of the mixture desired.

K K represents the handles of the frame work of the sieve.

D is the frame work in which is fixed a series of rollers as seen in the drawing (M′) in which the sieve frame C may be moved forward and back with great ease. The rollers are so constructed as to revolve easily.

E represents a second reservoir or box into which the mortar is received after passing through the sieve R; H, the spout to the box E.

P represents the gate, by raising which the mixture passes through the spout onto a temporary floor or into any reservoir desirable.

*The mode of operation.*—I put in the box A about ½ or ¾ of the desired quantity of sand, then the necessary quantity of lime and water, keeping the lime covered with water so that it will not burn or slake dry. When properly slaked stir up the mixture with a hoe or any other convenient instrument till the lime, water, and sand are perfectly mixed, mixing in the meantime remainder of sand required. Then I raise the gate F and let the mixture the box being properly raised run into the sieve R moving the sieve backward and forward quickly upon the rollers in the frame D until the sieve gets so full of coarse sand or sediment that it is desirable to empty it. I then shut down the gate (F) and draw the sieve backward and forward till nothing remains but the sediment. I then draw the sieve back till it will clear the box and empty it. This much done it is prepared for brick mortar, after it has laid long enough to become thick by evaporation and drainage. In warm weather this time may not be more than 24 hours. But it is much better to let it lay one week or month or much longer when it is in a large mass. For brick mortar I do not use the box or reservoir E. For plaster mortar the process is the same with these additions: The hair is mixed in box E. After, however, it has been well soaked a small quantity of good lime should be put in with the hair and water to slake the same and thoroughly stirred with the hair while slaking. This aids in mixing the hair. Then raise the gate F and let the mortar from box A run through the sieve into the box E with the hair, at the same time stirring the mortar and hair till the mixture becomes complete. Then raise the gate P in box E and let it run out into a pit or any other convenient receptacle.

When large quantities of mortar are to be mixed I make the boxes or reservoirs circular, as heretofore stated. I put the lime and sand together as herein described and mix by the application of any of the known powers. If the mortar becomes too dry it may be tempered with advantage by putting it into one of the boxes and stirring it while tempering by means of the powers aforesaid.

The advantages or benefits arising from preparing mortar in the mode herein described over all others in use are the following: 1st. It is more easily prepared, a man will make a much greater quantity per day, particularly when the sand and lime contain coarse siftings, and it will be of a superior quality by passing through the sieve in a mixed state, thus becoming more thoroughly mixed. 2d. Masons can perform more labor per day with mortar thus prepared. 3d. The masonry is much better because the mortar is more firmly mixed, has a greater tenacity to the brick and these can be laid much closer together.

What I claim as my invention and desire to secure by Letters Patent is—

The mixing of the lime and sand together before straining substantially in the manner and for the purpose herein set forth.

JESSE PECK.

Witnesses:
V. M. RICE,
A. B. WARNER.